United States Patent
Cha (10) Patent No.: US 9,154,218 B2
(45) Date of Patent: Oct. 6, 2015

(54) METHOD AND APPARATUS FOR BLUETOOTH CONNECTION IN MOBILE TERMINAL AND COMPUTER-READABLE MEDIUM THEREOF

(71) Applicant: Samsung Electronics Co., Ltd., Gyeonggi-do (KR)

(72) Inventor: Ji-Young Cha, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 194 days.

(21) Appl. No.: 13/790,886

(22) Filed: Mar. 8, 2013

(65) Prior Publication Data

US 2013/0260690 A1   Oct. 3, 2013

(30) Foreign Application Priority Data

Mar. 30, 2012  (KR) .................. 10-2012-0033031

(51) Int. Cl.
| | |
|---|---|
| *H04W 4/04* | (2009.01) |
| *H04B 7/26* | (2006.01) |
| *H04M 1/725* | (2006.01) |
| *H04W 84/18* | (2009.01) |
| *H04W 76/02* | (2009.01) |
| *H04W 76/04* | (2009.01) |

(52) U.S. Cl.
CPC ............ *H04B 7/26* (2013.01); *H04M 1/7253* (2013.01); *H04M 2250/02* (2013.01); *H04W 76/023* (2013.01); *H04W 76/043* (2013.01); *H04W 84/18* (2013.01)

(58) Field of Classification Search
USPC ............ 455/41.2, 414.1, 418, 435.1, 435.2, 455/450, 452.1, 452.2, 454, 509, 512, 566
See application file for complete search history.

(56) References Cited

U.S. PATENT DOCUMENTS

| | | | | |
|---|---|---|---|---|
| 8,649,812 | B2* | 2/2014 | Shimizu et al. | 455/512 |
| 2002/0118664 | A1 | 8/2002 | Ishibashi et al. | |
| 2003/0036350 | A1 | 2/2003 | Jonsson et al. | |
| 2006/0075090 | A1 | 4/2006 | Bocking et al. | |
| 2007/0238475 | A1* | 10/2007 | Goedken | 455/512 |
| 2008/0146151 | A1 | 6/2008 | Lyu et al. | |

(Continued)

FOREIGN PATENT DOCUMENTS

| | | |
|---|---|---|
| CN | 101340212 A | 1/2009 |
| EP | 2 398 283 A1 | 12/2011 |

(Continued)

*Primary Examiner* — Blane J Jackson
(74) *Attorney, Agent, or Firm* — Cha & Reiter, LLC.

(57) ABSTRACT

A method and apparatus establish a connection in a mobile terminal with a device compatible with BLUETOOTH, a short range wireless communications technology at the 2.4 GHz band. If connectable BLUETOOTH devices are detected in the vicinity of the mobile terminal and there is at least one priority-registered BLUETOOTH device among the detected BLUETOOTH devices, the mobile terminal connects with a highest-priority BLUETOOTH device among the detected BLUETOOTH devices. If other connectable BLUETOOTH devices are detected in the vicinity of the mobile terminal while the mobile terminal is connected to a BLUETOOTH device, and there is at least one priority-registered BLUETOOTH device higher in priority than the currently connected BLUETOOTH device, among the detected BLUETOOTH devices, the mobile terminal switches the connection to a highest-priority BLUETOOTH device among the detected BLUETOOTH devices.

20 Claims, 9 Drawing Sheets (56) References Cited

U.S. PATENT DOCUMENTS

2009/0061769 A1* 3/2009 Zimbric et al. .............. 455/41.2
2012/0071097 A1* 3/2012 Matsushita et al. .......... 455/41.2

FOREIGN PATENT DOCUMENTS

| KR | 10-0703316 B1 | 3/2007 |
| KR | 10-2008-0056525 A | 6/2008 |

* cited by examiner

METHOD AND APPARATUS FOR BLUETOOTH CONNECTION IN MOBILE TERMINAL AND COMPUTER-READABLE MEDIUM THEREOF

CLAIM OF PRIORITY

This application claims, pursuant to 35 U.S.C. §119(a), priority to and the benefit of the earlier filing date of a Korean Patent Application filed in the Korean Intellectual Property Office on Mar. 30, 2012 and assigned Serial No. 10-2012-0033031, the entire disclosure of which is incorporated herein by reference.

BACKGROUND OF THE INVENTION

1. Field of the Invention

The present invention relates generally to a mobile terminal with BLUETOOTH features, and more particularly, to a method and apparatus for establishing a BLUETOOTH connection to BLUETOOTH devices in a mobile terminal, and a computer-readable medium thereof.

2. Description of the Related Art

BLUETOOTH technology, a short range wireless communications technology at the 2.4 GHz band, commercially available from the "BLUETOOTH SPECIAL INTEREST GROUP, INC." allows communication devices to wirelessly communicate at close range without using wires. The BLUETOOTH technology uses an Industrial Scientific Medical (ISM) wireless band of 2.4 GHz that does not require authorization to use. A BLUETOOTH system supports point-to-point and point-to-multipoint connections between BLUETOOTH devices with BLUETOOTH features.

The BLUETOOTH technology is used for headsets, car kits which are hands-free devices mounted in vehicles, speakers, etc., and used to connect printers, keyboards, a mouse, etc., to personal computers (PCs) without cables. In addition, the BLUETOOTH technology is also used in various mobile terminals such as mobile phones, smart phones, tablet PCs, and laptop computers. A mobile terminal may transfer voice and data to various BLUETOOTH devices such as headsets, car kits and speakers, using the BLUETOOTH technology.

However, each time a user wants to newly connect a BLUETOOTH device to a mobile terminal or to switch from the BLUETOOTH device connected to the mobile terminal to another BLUETOOTH device, the user is typically annoyingly required to manipulate the mobile terminal directly to establish a new connection to the BLUETOOTH device or to switch to another BLUETOOTH device.

SUMMARY OF THE INVENTION

An aspect of exemplary embodiments of the present invention is to provide a method and apparatus capable of automatically connecting a BLUETOOTH device registered in advance by a user to a mobile terminal, and a computer-readable medium thereof.

Another aspect of exemplary embodiments of the present invention is to provide a method and apparatus capable of automatically connecting a plurality of BLUETOOTH devices to a mobile terminal selectively depending on the priorities of each of the BLUETOOTH devices registered in the mobile terminal, and a computer-readable medium thereof.

Another aspect of exemplary embodiments of the present invention is to provide a method and apparatus capable of automatically switching a connection of a mobile terminal to a plurality of BLUETOOTH devices depending on the priorities of each of the BLUETOOTH devices registered in the mobile terminal, and a computer-readable medium thereof.

In accordance with one aspect of the present invention, there is provided a method for establishing a BLUETOOTH connection in a mobile terminal The method includes detecting a connectable BLUETOOTH device in the vicinity of the mobile terminal; and connecting with a highest-priority BLUETOOTH device among any detected BLUETOOTH devices, if there is at least one priority-registered BLUETOOTH device among the detected BLUETOOTH devices.

In accordance with another aspect of the present invention, there is provided a method for establishing a BLUETOOTH connection in a mobile terminal The method includes detecting another connectable BLUETOOTH device in the vicinity of the mobile terminal while the mobile terminal is connected to a BLUETOOTH device; and switching the connection to a highest-priority BLUETOOTH device among the detected BLUETOOTH devices, if there is at least one priority-registered BLUETOOTH device higher in priority than the currently connected BLUETOOTH device, among the detected BLUETOOTH devices.

In accordance with further another aspect of the present invention, there is provided an apparatus for establishing a BLUETOOTH connection in a mobile terminal The apparatus includes a BLUETOOTH module for providing a BLUETOOTH communication between the mobile terminal and a BLUETOOTH device; and a controller for detecting a connectable BLUETOOTH device in the vicinity of the mobile terminal, and connecting with a highest-priority BLUETOOTH device among the detected BLUETOOTH devices using the BLUETOOTH module, if there is at least one priority-registered BLUETOOTH device among the detected BLUETOOTH devices.

In accordance with yet another aspect of the present invention, there is provided an apparatus for establishing a BLUETOOTH connection in a mobile terminal The apparatus includes a BLUETOOTH module for providing BLUETOOTH communication between the mobile terminal and a BLUETOOTH device; and a controller for detecting another connectable BLUETOOTH device in the vicinity of the mobile terminal while the mobile terminal is connected to a BLUETOOTH device using the BLUETOOTH module, and switching the connection to a highest-priority BLUETOOTH device among the detected BLUETOOTH devices, if there is at least one priority-registered BLUETOOTH device higher in priority than the currently connected BLUETOOTH device, among the detected BLUETOOTH devices.

In accordance with still another aspect of the present invention, there is provided a computer-readable medium recording a computer-executable program that includes detecting a connectable BLUETOOTH device in the vicinity of a mobile terminal; and connecting with a highest-priority BLUETOOTH device among the detected BLUETOOTH devices, if there is at least one priority-registered BLUETOOTH device among the detected BLUETOOTH devices.

In accordance with still another aspect of the present invention, there is provided a computer-readable medium recording a computer-executable program that includes detecting another connectable BLUETOOTH device in the vicinity of a mobile terminal while the mobile terminal is connected to a BLUETOOTH device; and switching the connection to a highest-priority BLUETOOTH device among the detected BLUETOOTH devices, if there is at least one priority-registered BLUETOOTH device higher in priority than the currently connected BLUETOOTH device, among the detected BLUETOOTH devices.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE INVENTION

Preferred embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Although exemplary embodiments of the present invention will be described with reference to a mobile terminal by way of example, the exemplary embodiments of the present invention may be applied to other devices having the similar technical backgrounds. It will be understood by those of ordinary skill in the art that exemplary embodiments of the present invention may be applied to other devices with slight modifications without departing from the scope of the invention. In other words, exemplary embodiments of the present invention may be applied to any other devices even though such other devices are not mobile terminals as long as such other devices have BLUETOOTH features. For example, the present invention may be applied not only to desktop computers but also to multimedia devices such as MPEG-1 Audio Layer-3 (MP3) players, Portable Multimedia Players (PMPs), and digital cameras, as long as such multimedia devices have BLUETOOTH features.

Also, terms described herein, which are defined considering the functions of the present invention, may be implemented differently depending on user and operator's intention and practice. Therefore, the terms should be understood on the basis of the disclosure throughout the specification. The principles and features of this invention may be employed in varied and numerous embodiments without departing from the scope of the invention.

The same reference numbers are used throughout the drawings to refer to the same or like parts. Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, an icon refers to a graphical element such as a figure or a symbol displayed on the screen of the device such that a user can easily select a desired function or data. In particular, each icon has a mapping relation with any function being executable in the device or with any data stored in the device and is used for processing functions or selecting data in the device. When a user selects one of the displayed icons, the device identifies a particular function or data associated with the selected icon. Then the device executes the identified function or displays the identified data.

Among terms set forth herein, data refers to any kind of information processed by the device, including text and/or images received from any external entities, messages transmitted or received, and information created when a specific function is executed by the device.

Figure 1:
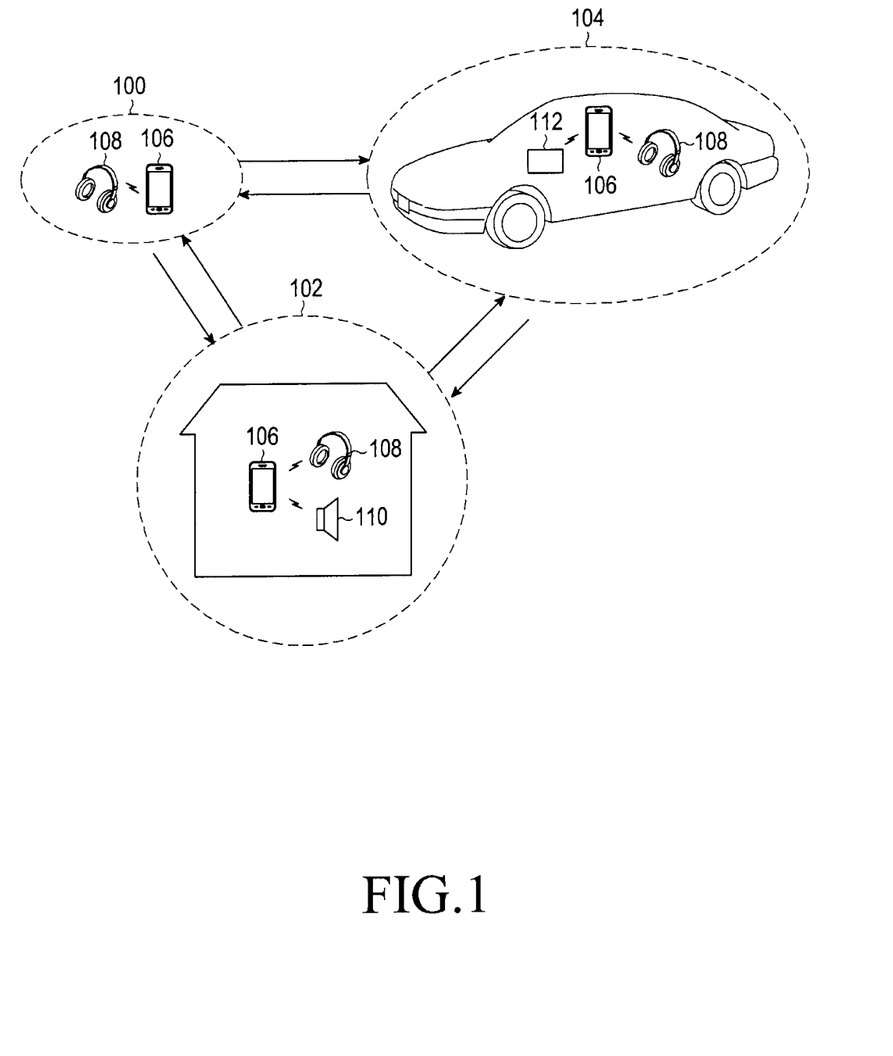
FIG. 1 shows examples of BLUETOOTH connections according to an exemplary embodiment of the present invention.

FIG. 1 shows examples of BLUETOOTH connections according to an exemplary embodiment of the present invention, which shows changes in environment where a user of a mobile terminal 106 supporting BLUETOOTH connects a BLUETOOTH device to the mobile terminal 106 to use the BLUETOOTH connections. The BLUETOOTH device is a device which operates using BLUETOOTH, a short range wireless communications technology at the 2.4 GHz band, commercially available from the "BLUETOOTH SPECIAL INTEREST GROUP, INC.". FIG. 1 shows examples of three different use environments: a pedestrian environment 100, a home environment 102, and a vehicle environment 104. In the example of the pedestrian environment 100, the user connects a BLUETOOTH headset 108 to the mobile terminal 106 to use the headset 108 while walking In the example of the home environment 102, the user connects the BLUETOOTH headset 108 or a BLUETOOTH speaker 110 to the mobile terminal 106 to use the headset 108 or the speaker 110 at home. In the example of the vehicle environment 104, the user connects the BLUETOOTH headset 108 or a BLUETOOTH car kit 112 mounted in the vehicle to the mobile terminal 106 to use the headset 108 or the car kit 112 after boarding the vehicle.

The use environments shown in FIG. 1 are mere examples for a description of the present invention, and such use environments may vary in implementations of the present invention. In each use environment, the types of or the number of BLUETOOTH devices connected to the mobile terminal 106 may also vary.

Depending on the use environments 100 to 104 shown in FIG. 1, the user may newly connect a BLUETOOTH device to the mobile terminal 106, or switch the connection from an already connected BLUETOOTH device to another BLUETOOTH device.

The pedestrian environment 100 is now described in greater detail. If the user enters the pedestrian environment 100, carrying the mobile terminal 106 with him or her, with no BLUETOOTH device connected to the mobile terminal 106, then the user may newly connect the BLUETOOTH headset 108 to the mobile terminal 106. In contrast, if the user enters the pedestrian environment 100, carrying the mobile terminal 106 and the BLUETOOTH headset 108 with him or her, with the BLUETOOTH headset 108 connected to the mobile terminal 106, then the user may maintain the connection between the mobile terminal 106 and the BLUETOOTH headset 108.

The home environment 102 is now described in greater detail. If the user enters the home environment 102, carrying the mobile terminal 106 with him or her, with no BLUETOOTH device connected to the mobile terminal 106, then the user may newly connect the BLUETOOTH headset 108 or the BLUETOOTH speaker 110 to the mobile terminal 106. In contrast, if the user enters the home environment 102, carrying the mobile terminal 106 and the BLUETOOTH headset 108 with him or her, with the BLUETOOTH headset 108 connected to the mobile terminal 106, then the user may maintain the connection between the mobile terminal 106 and the BLUETOOTH headset 108, or may switch the connection from the BLUETOOTH headset 108 to the BLUETOOTH speaker 110.

The vehicle environment 104 is now described in greater detail. If the user enters the vehicle environment 104, carrying the mobile terminal 106 with him or her, with no BLUETOOTH device connected to the mobile terminal 106, then the user may newly connect the BLUETOOTH car kit 112 or the BLUETOOTH headset 108 to the mobile terminal 106. In contrast, if the user enters the vehicle environment 104, carrying the mobile terminal 106 and the BLUETOOTH headset 108 with him or her, with the BLUETOOTH headset 108 connected to the mobile terminal 106, then the user may maintain the connection between the mobile terminal 106 and the BLUETOOTH headset 108, or may switch the connection from the BLUETOOTH headset 108 to the BLUETOOTH car kit 112.

However, as described above, in the prior art, each time the user wants to newly connect a BLUETOOTH device to a mobile terminal with no BLUETOOTH device connected thereto, or to switch from the BLUETOOTH device connected to the mobile terminal to another BLUETOOTH device, in the prior art, the user has been annoyingly required to manipulate the mobile terminal directly to establish a new connection to the BLUETOOTH device or to switch to another BLUETOOTH device.

Accordingly, the present invention makes it possible to automatically connect a BLUETOOTH device registered in advance by a user to a mobile terminal 106. In particular, the present invention makes it possible to automatically connect a plurality of BLUETOOTH devices to a mobile terminal 106 selectively depending on the priorities of each of the devices registered in the mobile terminal 106. In addition, the present invention makes it possible to automatically switch a connection of a mobile terminal 106 to a plurality of BLUETOOTH devices depending on the priorities of each of the devices registered in the mobile terminal 106.

Figure 2:
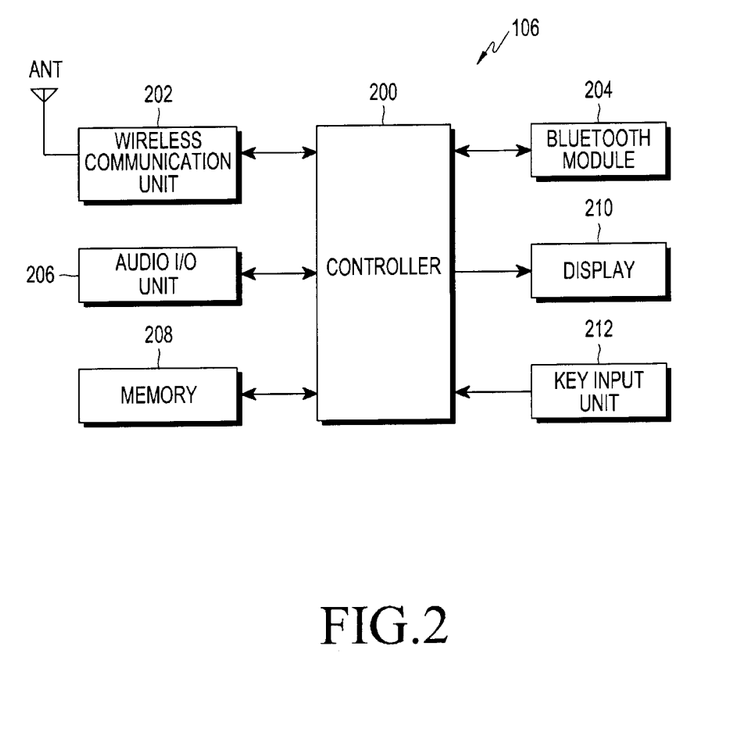
FIG. 2 is a block diagram of a mobile terminal for establishing a BLUETOOTH connection according to the exemplary embodiment of the present invention.

FIG. 2 is a block diagram of a mobile terminal 106 for establishing a BLUETOOTH connection according to the exemplary embodiment of the present invention. The mobile terminal 106 shown in FIG. 2 may be any one of, for example, a laptop computer, a tablet computer, a mobile phone, a smart phone, and a Personal Digital Assistant (PDA). Referring to FIG. 2, the mobile terminal 106 includes a controller 200, a wireless communication unit 202, a BLUETOOTH module 204, an audio input/output (I/O) unit 206, a memory 208, a display 210, and a key input unit 212.

The wireless communication unit 202 transmits and receives wireless signals for mobile communication of the mobile terminal 106 under control of the controller 200. The BLUETOOTH module 204 performs BLUETOOTH communication with BLUETOOTH devices in the vicinity of the mobile terminal 106 under control of the controller 200. The audio I/O unit 206 inputs and outputs various sounds, such as voice or audio from audio files, associated with operations of the mobile terminal 106 and/or the controller 200. The memory 208 stores a program for operations of the controller 200, and stores various data generated during execution of operations of terminal 106 and/or the controller 200. The memory 208 may further include an external memory, and may also include a storage device such as Hard Disk Drive (HDD). The display 210 displays images generated by operations of the controller 200. The key input unit 212 provides various key inputs needed for operations of the mobile terminal 106, input from the user, to the controller 200. The key input unit 212 may include a touch screen panel mounted on or included in the display 210, and may include numeric/character keys for inputting numeric/character information, and function keys for setting various functions. The controller 200 controls the overall operation of the mobile terminal 106. In accordance with the exemplary embodiment of the present invention, the controller 200 connects BLUETOOTH devices to the mobile terminal 106 using the BLUETOOTH module 204 of the mobile terminal 106.

Figure 3:
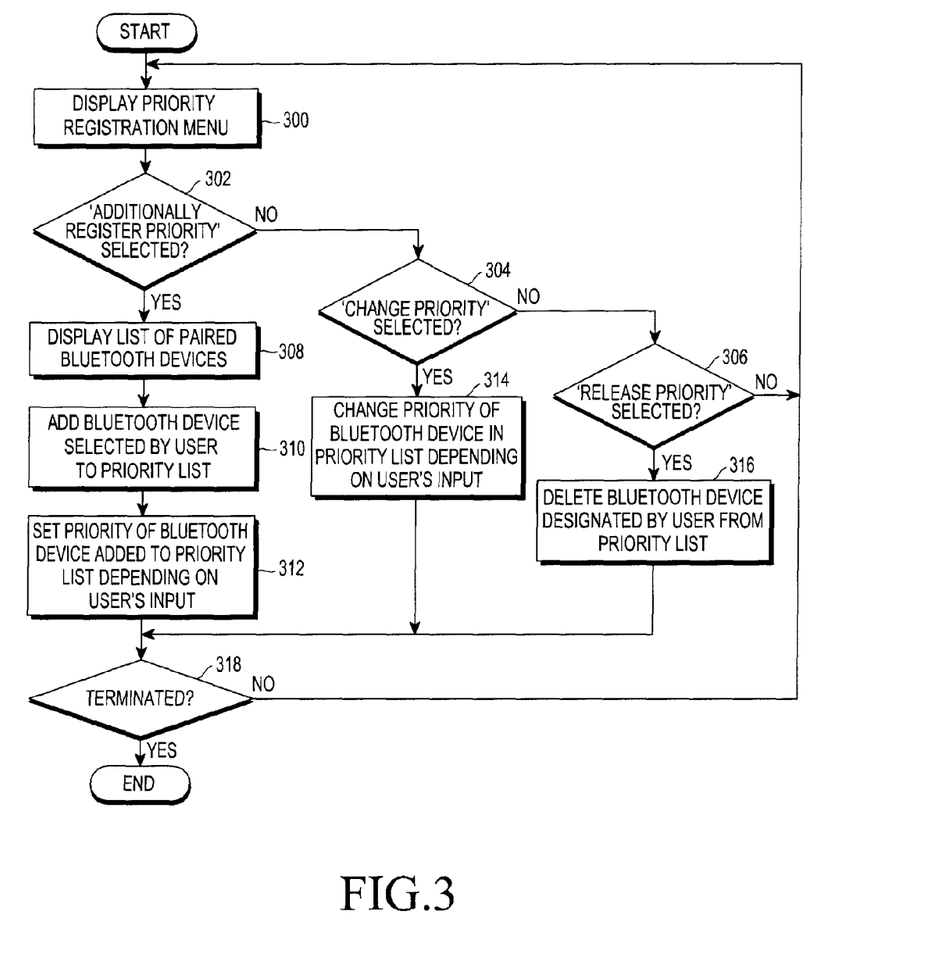
FIG. 3 shows a process of registering priorities according to the exemplary embodiment of the present invention.

FIG. 3 shows a process of registering priorities according to the exemplary embodiment of the present invention. In this process, the controller 200 registers priorities of BLUETOOTH devices using a user to connect a BLUETOOTH device to the mobile terminal 106 according to the exemplary embodiment of the present invention. The BLUETOOTH devices, which are subject to priority registration, may be BLUETOOTH devices paired to the mobile terminal 106.

Referring to FIG. 3, if the user selects a priority registration menu using the key input unit 212, the controller 200 displays the priority registration menu on the display 210 in response thereto in step 300. The priority registration menu is a menu which is added to the common menus provided by the mobile terminal 106 according to the exemplary embodiment of the present invention, and may be added as an item of the common BLUETOOTH setting menu. The priority registration menu may include user selectable choices and functions, such as 'Additionally Register Priority', 'Change Priority', and 'Release Priority'. Thereafter, in steps 302 to 306, the controller 200 receives one of 'Additionally Register Priority', 'Change Priority', and 'Release Priority', respectively, selected by the user based on inputs from the user through the key input unit 212.

Figure 4A:
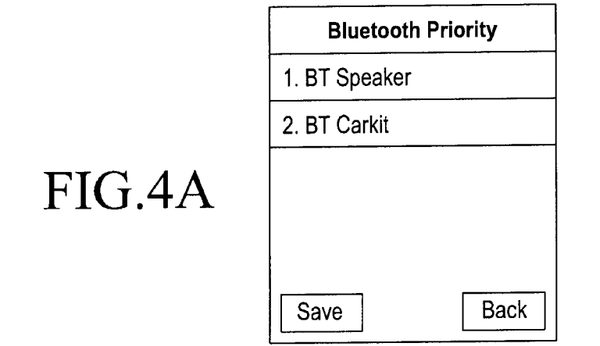
FIGS. 4A, 4B and 4C show examples of priority registration menus according to the exemplary embodiment of the present invention.
Figure 4B:
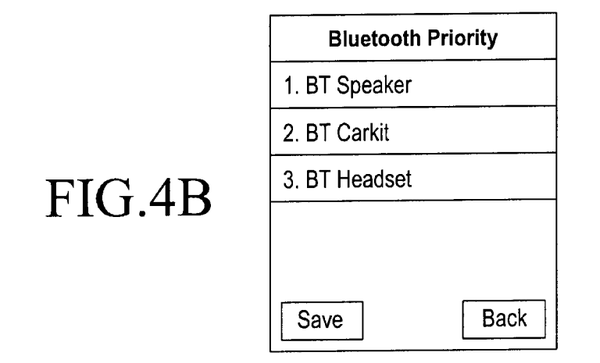
Figure 4C:
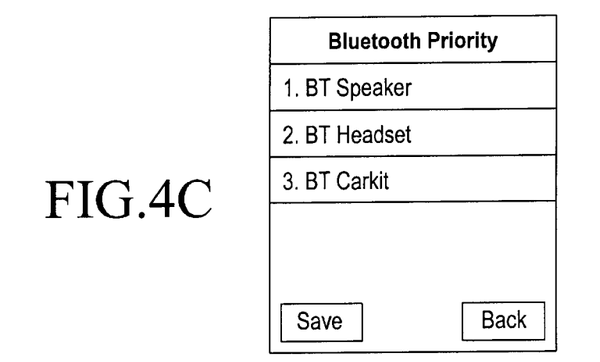

FIGS. 4A to 4C show examples of priority registration menus according to the exemplary embodiment of the present invention, in which a menu screen is displayed on the display 210 when the key input unit 212 includes a touch screen panel mounted on or included in the display 210. As shown in FIGS. 4A to 4C, a priority registration menu includes a priority list, in which the priority list is defined as a list of BLUETOOTH devices whose priorities are registered, and is stored in the memory 208 by the controller 200. FIG. 4A shows an example where a list of priority-registered BLUETOOTH devices includes "BT Speaker" and "BT Carkit". FIGS. 4B and 4C show examples where a list of priority-registered BLUETOOTH devices includes "BT Speaker", "BT Carkit", and "BT Headset". "BT Speaker" represents the BLUETOOTH speaker 110, "BT Carkit" represents the BLUETOOTH car kit 112, and "BT Headset" represents the BLUETOOTH headset 108. Numbers 1, 2 and 3 displayed in front of or substantially adjacent to "BT Speaker", "BT Carkit", and "BT Headset" represent the priorities of each of the devices 108, 110, 112, respectively. If there is no priority-registered BLUETOOTH device, the priority list will be empty in the priority registration menus shown in FIGS. 4A to 4C.

The user may additionally register priorities of new BLUETOOTH devices or may change or release priorities of registered BLUETOOTH devices, while the priority registration menu is displayed. Using the key input unit 212, the user may select one of 'Additionally Register Priority', 'Change Priority', and 'Release Priority', and then may register new BLUETOOTH devices in the priority list and set priorities thereof, or may change or release priorities of the registered BLUETOOTH devices. It will be understood by those of ordinary skill in the art that in a mobile terminal, a user's additionally registering, changing and releasing priorities of BLUETOOTH devices in an available and displayed editable list may be achieved by, for example, touching or inputting a predetermined icon or number on the key input unit 212 and/or a touch screen of the display 210 using a graphic user interface (GUI) in a manner known in the art. A more detailed description thereof is omitted herein.

Referring back to FIG. 3, if the user selects 'Additionally Register Priority' in step 302, the controller 200 performs step 308 in response to the selection; otherwise, the process proceeds to step 304. In step 308, the controller 200 displays a list of paired BLUETOOTH devices. The list of paired BLUETOOTH devices is defined as a list of BLUETOOTH devices paired to the mobile terminal 106, and is stored in the memory 208 by the controller 200. Next, in step 310, the controller 200 adds BLUETOOTH devices, selected by the user from among the BLUETOOTH devices in the list of paired BLUETOOTH devices, to the priority list. In step 312, the controller 200 sets priorities of the BLUETOOTH devices added to the priority list depending on the user's input. For example, if the user additionally registers a priority of the BLUETOOTH headset 108 or "BT Headset" and sets a priority thereof as '3' while the BLUETOOTH speaker 110 or "BT Speaker" is already registered with a priority of '1' and the BLUETOOTH car kit 112 or "BT Carkit" is already registered with a priority of '2' as shown in FIG. 4A, then the priority registration results are changed to have the appearance of the priority list shown on the priority registration menu of FIG. 4B.

If the user selects 'Change Priority' in step 304, the controller 200 performs step 314 in response to the selection; otherwise, the process proceeds to step 306. In step 314, the controller 200 changes priorities of priority-registered BLUETOOTH devices, i.e., BLUETOOTH devices in the priority list, depending on the user's input. For example, if the user exchanges priorities of the BLUETOOTH car kit 112 or "BT Carkit" and the BLUETOOTH headset 108 or "BT Headset" while the BLUETOOTH speaker 110 or "BT Speaker" is already registered with a priority of '1', the BLUETOOTH car kit 112 or "BT Carkit" is registered with a priority of '2', and the BLUETOOTH headset 108 or "BT Headset" is already registered with a priority of '3' as shown in FIG. 4B, then the priority registration results are changed to have the appearance of the priority list shown on the priority registration menu of FIG. 4C.

If the user selects 'Release Priority' in step 306, the controller 200 performs step 316 in response to the selection; otherwise, the process loops back to step 300. In step 316, the controller 200 releases priorities by deleting, from the priority list, BLUETOOTH devices designated by the user among the priority-registered BLUETOOTH devices, i.e., BLUETOOTH devices in the priority list. For example, if the user releases a priority of the BLUETOOTH headset 108 or "BT Headset" while the BLUETOOTH speaker 110 or "BT Speaker" is already registered with a priority of '1', the BLUETOOTH car kit 112 or "BT Carkit" is already registered with a priority of '2', and the BLUETOOTH headset 108 or "BT Headset" is already registered with a priority of '3' as shown in FIG. 4B, then the priority registration results are changed to have the appearance of the priority list shown on the priority registration menu of FIG. 4A.

After performing steps 312 to 316, if a "Save" icon on the priority registration menus of FIGS. 4A to 4C is touched by the user, the controller 200 terminates the priority registration process after saving the priority list in response to the touch in step 318, and the process of FIG. 3 ends. Otherwise, the controller 200 returns to step 300. If a "Back" icon on the priority registration menus of FIGS. 4A to 4C is touched by the user during execution of steps 300 to 318, the controller 200 returns to the previous step.

Figure 5:
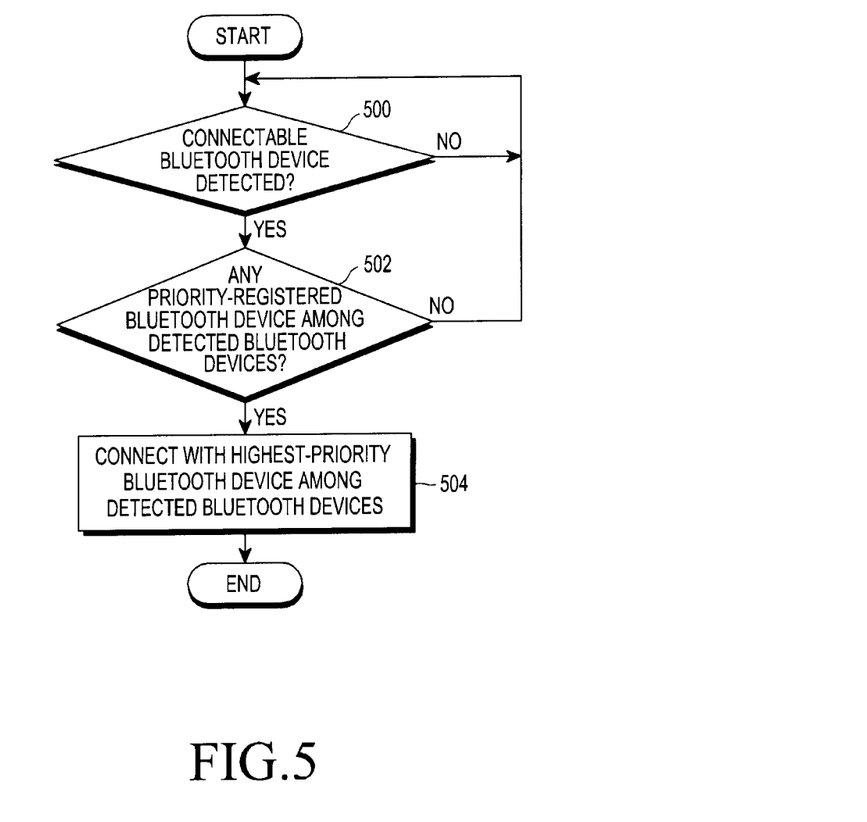
FIG. 5 shows a process of connecting a mobile terminal to a BLUETOOTH device according to a first exemplary embodiment of the present invention.

FIG. 5 shows a process of connecting a mobile terminal to a BLUETOOTH device according to a first exemplary embodiment of the present invention. In the process of FIG. 5, the mobile terminal 106 newly connects with a BLUETOOTH device, with no BLUETOOTH device connected to the mobile terminal 106. Referring to FIG. 5, if the controller 200 of the mobile 106 detects a connectable BLUETOOTH device in step 500, the controller 200 performs step 502; otherwise, the process loops back to step 500.

The term 'connectable BLUETOOTH device' as used herein may refer to a BLUETOOTH device that exists in the vicinity of the mobile terminal 106, is powered on, and approaches the mobile terminal 106 within a distance where establishment of a BLUETOOTH communication with the mobile terminal 106 is possible. The connectable BLUETOOTH device may be detected in two different ways. In a first case, to search for a BLUETOOTH device in the vicinity of the mobile terminal 106, the controller 200 may transmit an advertising event and detect a BLUETOOTH device responding thereto, using the BLUETOOTH module 204. In a second case, the controller 200 may detect an advertising event that a BLUETOOTH device in the vicinity of the mobile terminal 106 periodically transmits, by BLUETOOTH scanning using the BLUETOOTH module 204, thereby detecting a connectable BLUETOOTH device. In accordance with the exemplary embodiment of the present invention, since the mobile terminal 106 automatically continues to detect BLUETOOTH devices, it is preferable that the mobile terminal 106 detects BLUETOOTH devices based on the BLUETOOTH Specification Version 4.0 Low Energy (LE) technology to reduce its power consumption.

In step 502, the controller 200 determines whether there is any priority-registered BLUETOOTH device among the detected BLUETOOTH devices. If the controller 200 determines in step 502 that there is no priority-registered BLUETOOTH device, the controller 200 again performs step 500 and its successive steps. Otherwise, if the controller 200 determines in step 502 that there is a priority-registered BLUETOOTH device among the detected BLUETOOTH devices, the controller performs step 504. In step 504, the controller 200 connects with the highest-priority BLUETOOTH device among the detected BLUETOOTH devices, using the BLUETOOTH module 204.

A description follows of a case, for example, where the user enters the home environment 102 shown in FIG. 1, carrying the mobile terminal 106 with him or her, with no BLUETOOTH device connected to the mobile terminal 106. If the BLUETOOTH headset 108 and the BLUETOOTH speaker 110, whose priorities are registered as in FIG. 4B, are powered on and the BLUETOOTH headset 108 and the BLUETOOTH speaker 110 exist within a distance where the devices 108, 110 can perform BLUETOOTH communication with the mobile terminal 106, then the BLUETOOTH headset 108 and the BLUETOOTH speaker 110 will be detected in step 500.

Since the BLUETOOTH speaker 110 is higher in priority than the BLUETOOTH headset 108, the controller 200 may connect with the BLUETOOTH speaker 110. Accordingly, if the user enters the home environment 102, carrying the mobile terminal 106 with him or her, with no BLUETOOTH device connected to the mobile terminal 106, the user may use the BLUETOOTH speaker 110 without separately manipulating the mobile terminal 106, as the BLUETOOTH speaker 110 is automatically connected to the mobile terminal 106.

In some cases, the BLUETOOTH speaker 110 may have been powered off when the user enters the home environment 102. In this case, if the user simply turns on power of the BLUETOOTH speaker 110 after entering the home environment 102 carrying the mobile terminal 106 with him or her, the BLUETOOTH speaker 110 may be automatically connected to the mobile terminal 106 even though the user does not separately manipulate the mobile terminal 106 to establish the connection.

With reference to the description of the home environment 102, those of ordinary skill in the art may easily understand that connections of the mobile terminal 106 to other devices in the pedestrian environment 100 and the vehicle environment 104 shown in FIG. 1 are substantially similar or identical to the above description of the establishment of the connection of the mobile terminal 106 to other devices in the home environment 102. Therefore, a description of connection in a case where the user enters the pedestrian environment 100 or the vehicle environment 104, with no BLUETOOTH device connected to the mobile terminal 106, will be omitted.

Figure 6:
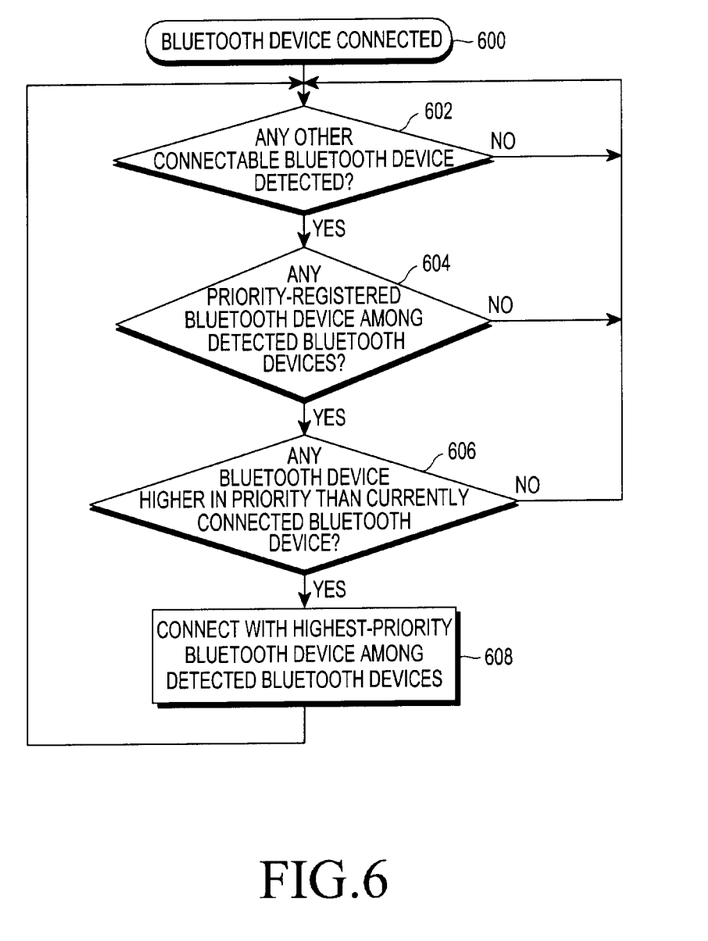
FIG. 6 shows a process of switching a connection from a BLUETOOTH device to another BLUETOOTH device in a mobile terminal according to a second exemplary embodiment of the present invention.

FIG. 6 shows a process of switching a connection from a BLUETOOTH device to another BLUETOOTH device in a mobile terminal 106 according to a second exemplary embodiment of the present invention. In the process of FIG. 6, the mobile terminal 106 switches its connection to another BLUETOOTH device, with a specific BLUETOOTH device already connected to the mobile terminal 106. Referring to FIG. 6, while a BLUETOOTH device is connected in step 600, upon detecting another connectable BLUETOOTH device other than the currently connected BLUETOOTH device in step 602, the controller 200 performs step 604; otherwise, the process loops back to step 602.

In step 604, the controller 200 determines whether there is any priority-registered BLUETOOTH device among the detected BLUETOOTH devices. If the controller 200 determines in step 604 that there is no priority-registered BLUETOOTH device, the controller 200 again performs step 602 and its successive steps. Accordingly, the controller 200 continues to detect priority-registered BLUETOOTH devices, while maintaining its connection with the currently connected BLUETOOTH device. In contrast, if the controller 200 determines in step 604 that there is a priority-registered BLUETOOTH device, the controller 200 performs step 606.

In step 606, the controller 200 determines whether there is any BLUETOOTH device higher in priority than the currently connected BLUETOOTH device, among the detected BLUETOOTH devices. If there is a BLUETOOTH device whose priority is higher than that of the currently connected BLUETOOTH device, among the detected BLUETOOTH devices, the controller 200 proceeds to step 608. The currently connected BLUETOOTH device may be a BLUETOOTH device whose priority is not registered. In this case, the currently connected BLUETOOTH device is regarded as a BLUETOOTH device whose priority is lower than that of the lowest-priority BLUETOOTH device among the priority-registered BLUETOOTH devices. In step 608, the controller 200 switches its connection to the highest-priority BLUETOOTH device among the detected BLUETOOTH devices using the BLUETOOTH module 204, and then again performs step 602 and its successive steps.

However, if the controller 200 determines in step 606 that there is no BLUETOOTH device which is higher in priority than the currently connected BLUETOOTH device, among the detected BLUETOOTH devices, i.e., if the currently connected BLUETOOTH device is higher in priority than the detected BLUETOOTH device, the controller 200 again performs step 602 and its successive steps. Accordingly, if the currently connected BLUETOOTH device is higher in priority than the detected BLUETOOTH device, the controller 200 continues to detect priority-registered BLUETOOTH devices, while maintaining its connection with the currently connected BLUETOOTH device.

For example, in a case where the user enters the home environment 102 shown in FIG. 1, carrying the mobile terminal 106 and the BLUETOOTH headset 108 with him or her, with the BLUETOOTH headset 108 connected to the mobile terminal 106, if the BLUETOOTH speaker 110, whose priority is registered as in FIG. 4B, is powered on, and the BLUETOOTH speaker 110 exists within a distance where the speaker 110 can establish a BLUETOOTH communication with the mobile terminal 106, the BLUETOOTH speaker 110 will be detected in step 602.

Then, the controller 200 will switch its connection from the BLUETOOTH headset 108 to the BLUETOOTH speaker 110 because the BLUETOOTH speaker 110 is higher in priority than the BLUETOOTH headset 108. Accordingly, if the user enters the home environment 102 while listening to music outside the home using the BLUETOOTH headset 108 connected to the mobile terminal 106, the user may continue to listen to the music using the BLUETOOTH speaker 110 instead of the BLUETOOTH headset 108 without separately manipulating the mobile terminal 106 because the BLUETOOTH speaker 110 is automatically connected to the mobile terminal 106.

In some cases, the BLUETOOTH speaker 110 may have been powered off when the user enters the home environment 102. In this case, if the user simply turns on power of the BLUETOOTH speaker 110 after entering the home environment 102 carrying the mobile terminal 106 with him or her, the connection will be automatically switched from the BLUETOOTH headset 108 to the BLUETOOTH speaker 110 even though the user does not separately manipulate the mobile terminal 106.

With reference to the description of the home environment 102, those of ordinary skill in the art may easily understand that connection for switching in the vehicle environment 104 shown in FIG. 1 is substantially similar or identical to the above description of the establishment of the switching in the home environment 102. Therefore, a description of connection switching in a case where the user enters the vehicle environment 104, with a BLUETOOTH device connected to the mobile terminal 106, will be omitted. No connection switching may occur in the pedestrian environment 100 shown in FIG. 1, because in the example of the pedestrian environment 100, there is only one priority-registered BLUETOOTH device, i.e., the BLUETOOTH headset 108.

Figure 7:
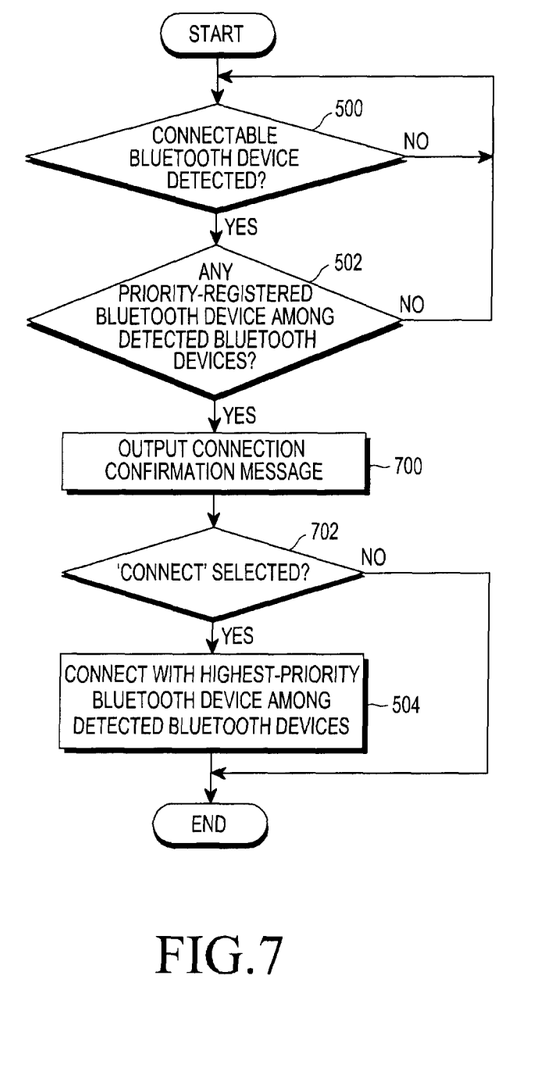
FIG. 7 shows a process of connecting a mobile terminal to a BLUETOOTH device according to a third exemplary embodiment of the present invention.

FIG. 7 shows a process of connecting a mobile terminal to a BLUETOOTH device according to a third exemplary embodiment of the present invention, in which steps 700 and 702 are added in between steps 502 and 504 in the process of FIG. 5. Steps 500 to 504 in FIG. 7 are the same as steps 500 to 504 in FIG. 5, so a description thereof will be omitted.

If the controller 200 determines in step 502 that there is a priority-registered BLUETOOTH device among the detected BLUETOOTH devices, the controller 200 performs steps 700 and 702 before step 504. In step 700, the controller 200 outputs a connection confirmation message on the display 210. The connection confirmation message is a message for notifying the user of the detection of a high-priority BLUETOOTH device and allowing the user to determine whether to connect with the detected BLUETOOTH device using the key input unit 212. For example, the connection confirmation message may be output in a pop-up form such as a text window with a wording "You have a high-priority 'BLUETOOTH' device available. Do you want to connect with it?", and the window may also display icons labeled 'Connect' or 'Ignore'. After outputting the connection confirmation message, the controller 200 determines in step 702 whether the user selects 'Connect'. If the user selects 'Connect', the controller 200 proceeds to step 504. Otherwise, if the user does not select 'Connect', the controller 200 ends the process.

Figure 8:
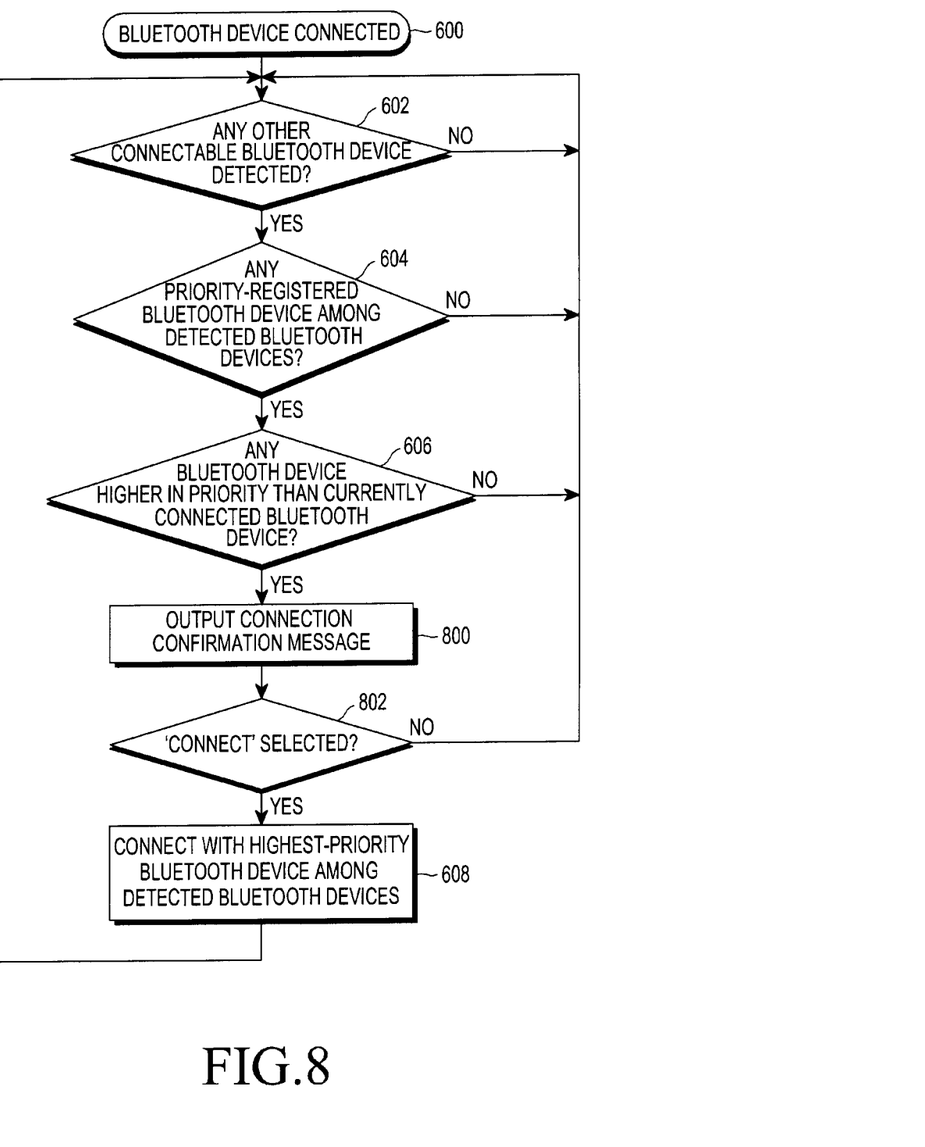
FIG. 8 shows a process of switching a connection from a BLUETOOTH device to another BLUETOOTH device in a mobile terminal according to a fourth exemplary embodiment of the present invention.

FIG. 8 shows a process of switching a connection from a BLUETOOTH device to another BLUETOOTH device in a mobile terminal according to a fourth exemplary embodiment of the present invention, in which steps 800 and 802 are added in between steps 606 and 608 in the process of FIG. 6. Steps 600 to 608 in FIG. 8 are the same as steps 600 to 608 in FIG. 6, so a description thereof will be omitted.

If the controller 200 determines in step 606 that there is a BLUETOOTH device whose priority is higher than that of the currently connected BLUETOOTH device, among the detected BLUETOOTH devices, the control 200 performs steps 800 and 802 before step 608. In step 800, the controller 200 outputs a connection confirmation message on the display 210, in a similar manner as in step 700 of FIG. 7. After outputting the connection confirmation message, the controller 200 determines in step 802 whether the user selects 'Connect'. If the user selects 'Connect', the controller 200 proceeds to step 608. Otherwise, if the user does not select 'Connect', the controller 200 returns to step 602.

Figure 9:
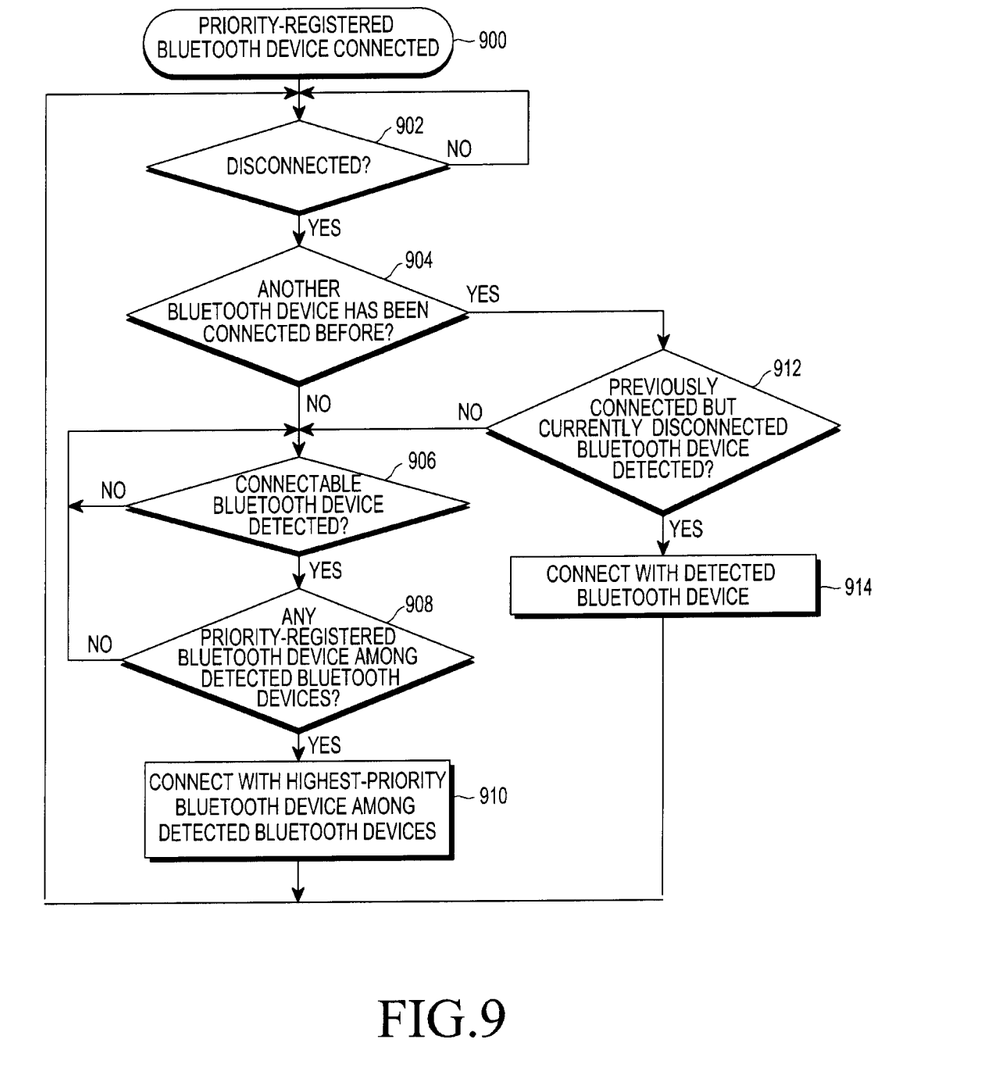
FIG. 9 shows a process of connecting a mobile terminal to a BLUETOOTH device according to a fifth exemplary embodiment of the present invention.

FIG. 9 shows a process of connecting a mobile terminal to a BLUETOOTH device according to a fifth exemplary embodiment of the present invention. In the process of FIG. 9, the mobile terminal 106 connects with another BLUETOOTH device, if the connection of the mobile terminal 106 is released while a specific priority-registered BLUETOOTH device is connected to the mobile terminal 106. Referring to FIG. 9, upon detecting the disconnection of the mobile terminal 106 from the currently connected BLUETOOTH device in step 902 while a priority-registered BLUETOOTH device is connected to the mobile terminal 106 in step 900, the controller 200 proceeds to step 904; otherwise, the process loops back to step 902. The currently connected BLUETOOTH device may be disconnected from the mobile terminal 106, for example when the distance between the mobile terminal 106 and the currently connected BLUETOOTH device is sufficiently far so that BLUETOOTH communication is difficult or impossible, or when the mobile terminal 106 and the currently connected BLUETOOTH device cannot communicate with each other due to obstacles therebetween.

In step 904, the controller 200 determines whether the mobile terminal 106 has been connected to another BLUETOOTH device other than the BLUETOOTH device from which the mobile terminal 106 has disconnected. For this determination step 904, the controller 200 stores and updates the connection history of BLUETOOTH devices in the memory 208. If the mobile terminal 106 has never been connected to another BLUETOOTH device, the controller 200 proceeds to step 906. In steps 906 to 910, as in the above-described steps 500 to 504 in FIG. 5, upon detecting a priority-registered BLUETOOTH device, the controller 200 connects with the highest-priority BLUETOOTH device among the detected BLUETOOTH devices using the BLUETOOTH module 204, and then returns to step 902.

However, if the controller 200 determines in step 904 that the mobile terminal 106 has been connected to another BLUETOOTH device, the controller 200 proceeds to step 912. Upon detecting in step 912 another BLUETOOTH device having been connected before, the controller 200 connects with the detected BLUETOOTH device using the BLUETOOTH module 204 in step 914, and then returns to step 902. Otherwise, upon detecting no another BLUETOOTH device having been connected before, the controller 200 proceeds to step 906. In implementations of the present invention, even though the controller 200 may determine in step 904 that the mobile terminal 106 has been connected to another BLUETOOTH device, if the BLUETOOTH device having been connected before is not a priority-registered BLUETOOTH device, the controller 200 may proceed to step 906 instead of step 912.

Therefore, even if a priority-registered BLUETOOTH device, which has been connected to the mobile terminal 106, is disconnected from the mobile terminal 106, the mobile terminal 106 may automatically connect with another connectable BLUETOOTH device without requiring the user's separate manipulation of the mobile terminal 106 for connection with a BLUETOOTH device.

While the invention has been shown and described with reference to certain exemplary embodiments thereof, it will be understood by those skilled in the art that various changes in form and details may be made therein without departing from the spirit and scope of the invention as defined by the appended claims and their equivalents. For example, even in the fifth embodiment shown in FIG. 9, the controller 200 may output a connection confirmation message to allow the user to determine whether he or she will select 'Connect', before steps 910 and/or 914, as described in connection with FIGS. 7 and 8. Although the first to fifth embodiments have been described separately, any combination of the first to fifth embodiments may be applied to the mobile terminal 106, in implementing the present invention.

As is apparent from the foregoing description, the present invention makes it possible to automatically connect a BLUETOOTH device registered in advance by a user to a mobile terminal In particular, the present invention makes it possible to automatically connect a plurality of BLUETOOTH devices to a mobile terminal selectively depending on their own priorities registered in the mobile terminal.

In addition, the present invention makes it possible to automatically switch a connection of a mobile terminal to a plurality of BLUETOOTH devices depending on their own priorities registered in the mobile terminal As a result, a user of a mobile terminal supporting BLUETOOTH features may establish a BLUETOOTH connection or switch the BLUETOOTH connection without requiring the user to manipulate the mobile terminal each time he or she wants to establish a BLUETOOTH connection or to switch the BLUETOOTH connection, so the user may use or enjoy the BLUETOOTH features more conveniently. In particular, amid the increasing use of BLUETOOTH devices such as BLUETOOTH headsets and BLUETOOTH speakers due to an increase in the number of users of mobile terminals such as tablet PCs, the proposed BLUETOOTH connection may help improve the use flexibility of BLUETOOTH devices to agree with the mobility of mobile terminals.

The above-described apparatus and methods according to the present invention can be implemented in hardware, firmware or as software or computer code that can be stored in a recording medium such as a CD ROM, a RAM, a ROM, a floppy disk, DVDs, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any media such as communication signals transmitted by wire/wireless connections, and their equivalents.

The BLUETOOTH connection method of the present invention may be created in a program and stored in storage media. A mobile terminal supporting BLUETOOTH may be used for establishing a BLUETOOTH connection by downloading a program or application for controlling a BLUETOOTH connection according to the present invention, from a remote program server, installing the downloaded program and running the installed program. In other words, if a program for establishing or using a BLUETOOTH connection is installed in a mobile terminal, the program runs in the mobile terminal, enabling the establishment or use of the BLUETOOTH connection. Upon receiving a transmission request for the program from the mobile terminal, the program server provides the program to the mobile terminal in response to the transmission request. The program server may determine whether the mobile terminal having requested transmission of the program has subscribed to the service, and whether a user of the mobile terminal is authorized, and check payment information of the mobile terminal. The program server may include storage media storing the program. The storage media may be located either inside or outside of the program server.

Therefore, the spirit and scope of the present invention should not be limited to the description of exemplary embodiments of the present invention, but should be defined by the appended claims and their equivalents.

What is claimed is:

1. A method for using a BLUETOOTH connection in a mobile terminal, comprising:
   detecting connectable BLUETOOTH devices in a vicinity of the mobile terminal;
   displaying a confirmation message to connect with a highest-priority BLUETOOTH device among the detected BLUETOOTH devices, if there is at least one priority-registered BLUETOOTH device among the detected BLUETOOTH devices; and
   in response to detecting a confirmation, connecting with the highest priority BLUETOOTH device.

2. The method of claim 1, further comprising connecting with another previously connected but currently disconnected BLUETOOTH device upon detecting another previously connected but currently disconnected BLUETOOTH device, if the connection with the currently connected BLUETOOTH device is released.

3. The method of claim 1, wherein the priority is registered in the mobile terminal in advance by a user, for a BLUETOOTH device paired with the mobile terminal.

4. A method for using a BLUETOOTH connection in a mobile terminal, comprising:
   detecting other connectable BLUETOOTH devices in a vicinity of the mobile terminal while the mobile terminal is connected to a BLUETOOTH device;
   displaying a confirmation message to switch the connection to a highest-priority BLUETOOTH device among the detected BLUETOOTH devices, if there is at least one priority-registered BLUETOOTH device higher in priority than the currently connected BLUETOOTH device, among the detected BLUETOOTH devices; and
   in response to detecting a confirmation, switching connection to the highest-priority BLUETOOTH device.

5. The method of claim 4, wherein the switching further comprises maintaining the connection with the currently connected BLUETOOTH device, if the currently connected BLUETOOTH device is higher in priority than the detected BLUETOOTH devices.

6. The method of claim 4, further comprising connecting with another previously connected but currently disconnected BLUETOOTH device upon detecting another previously connected but currently disconnected BLUETOOTH device, if the connection with the currently connected BLUETOOTH device is released.

7. The method of claim 4, wherein the priority is registered in the mobile terminal in advance by a user, for a BLUETOOTH device paired with the mobile terminal.

8. An apparatus for using a BLUETOOTH connection in a mobile terminal, comprising:
   a BLUETOOTH module for providing a BLUETOOTH communication between the mobile terminal and a BLUETOOTH device; and
   a controller for:
   detecting connectable BLUETOOTH devices in a vicinity of the mobile terminal, and
   displaying a confirmation message to connect with a highest-priority BLUETOOTH device among the detected BLUETOOTH devices using the BLUETOOTH module, if there is at least one priority-registered BLUETOOTH device among the detected BLUETOOTH devices, and in response to detecting a confirmation, connecting with the highest-priority BLUETOOTH device.

9. The apparatus of claim 8, wherein the controller connects with another previously connected but currently disconnected BLUETOOTH device upon detecting another previously connected but currently disconnected BLUETOOTH device, if the connection with the currently connected BLUETOOTH device is released.

10. The apparatus of claim 8, wherein the priority is registered in the mobile terminal in advance by a user, for a BLUETOOTH device paired with the mobile terminal.

11. An apparatus for using a BLUETOOTH connection in a mobile terminal, comprising:
 a BLUETOOTH module for providing a BLUETOOTH communication between the mobile terminal and a BLUETOOTH device; and
 a controller for:
 detecting other connectable BLUETOOTH devices in a vicinity of the mobile terminal while the mobile terminal is connected to a BLUETOOTH device using the BLUETOOTH module, and
 displaying a confirmation message to switch the connection to a highest-priority BLUETOOTH device among the detected BLUETOOTH devices, if there is at least one priority-registered BLUETOOTH device higher in priority than the currently connected BLUETOOTH device, among the detected BLUETOOTH devices, and
 in response to detecting a confirmation, switching the connection to the highest-priority BLUETOOTH device.

12. The apparatus of claim 11, wherein the controller maintains the connection with the currently connected BLUETOOTH device, if the currently connected BLUETOOTH device is higher in priority than the detected BLUETOOTH devices.

13. The apparatus of claim 11, wherein the controller connects with another previously connected but currently disconnected BLUETOOTH device upon detecting another previously connected but currently disconnected BLUETOOTH device, if the connection with the currently connected BLUETOOTH device is released.

14. The apparatus of claim 11, wherein the priority is registered in the mobile terminal in advance by a user, for a BLUETOOTH device paired with the mobile terminal.

15. A non-transitory computer-readable medium recording a computer-executable program comprising:
 detecting connectable BLUETOOTH devices in a vicinity of a mobile terminal;
 displaying a confirmation message to connect with a highest-priority BLUETOOTH device among the detected BLUETOOTH devices, if there is at least one priority-registered BLUETOOTH device among the detected BLUETOOTH devices; and
 in response to detecting a confirmation, connecting with the highest-priority BLUETOOTH device.

16. The non-transitory computer-readable medium of claim 15, wherein the computer-executable program further comprises connecting with another previously connected but currently disconnected BLUETOOTH device upon detecting another previously connected but currently disconnected BLUETOOTH device, if the connection with the currently connected BLUETOOTH device is released.

17. The non-transitory computer-readable medium of claim 15, wherein the priority is registered in the mobile terminal in advance by a user, for a BLUETOOTH device pared with the mobile terminal.

18. A non-transitory computer-readable medium recording a computer-executable program comprising:
 detecting other connectable BLUETOOTH devices in a vicinity of a mobile terminal while the mobile terminal is connected to a BLUETOOTH device;
 displaying a confirmation message to switch the connection to a highest-priority BLUETOOTH device among the detected BLUETOOTH devices, if there is at least one priority-registered BLUETOOTH device higher in priority than the currently connected BLUETOOTH device, among the detected BLUETOOTH devices; and
 in response to detecting a confirmation, switching the connection to the highest-priority BLUETOOTH device.

19. The non-transitory computer-readable medium of claim 18, wherein the switching further comprises maintaining the connection with the currently connected BLUETOOTH device, if the currently connected BLUETOOTH device is higher in priority than the detected BLUETOOTH devices.

20. The non-transitory computer-readable medium of claim 18, wherein the computer-executable program further comprises connecting with another previously connected but currently disconnected BLUETOOTH device upon detecting another previously connected but currently disconnected BLUETOOTH device, if the connection with the currently connected BLUETOOTH device is released.

* * * * *